US006327996B1

(12) United States Patent
Pruder et al.

(10) Patent No.: US 6,327,996 B1
(45) Date of Patent: Dec. 11, 2001

(54) BIOSECURE ZERO-EXCHANGE SYSTEM FOR MATURATION AND GROWOUT OF MARINE ANIMALS

(75) Inventors: Gary David Pruder, Honolulu; Shaun McAlpine Moss; Albert George Joseph Tacon, both of Kaneohe, all of HI (US)

(73) Assignee: The Oceanic Institute, Wiamanalo, HI (US)

( * ) Notice: Subject to any disclaimer, the term of this patent is extended or adjusted under 35 U.S.C. 154(b) by 0 days.

(21) Appl. No.: 09/479,782

(22) Filed: Jan. 7, 2000

(51) Int. Cl.$^7$ ............................ A01K 61/00; A01K 63/00
(52) U.S. Cl. ............................ 119/207; 119/228; 119/234
(58) Field of Search ................................... 119/204, 207, 119/209, 210, 226, 228, 234, 230, 232

(56) References Cited

U.S. PATENT DOCUMENTS

| Re. 30,038 | | 6/1979 | Sweeney . | |
|---|---|---|---|---|
| 3,916,832 | | 11/1975 | Sweeney . | |
| 3,998,186 | | 12/1976 | Hodges . | |
| 4,036,176 | * | 7/1977 | McCarty | 119/207 |
| 4,078,521 | | 3/1978 | Laubier . | |
| 4,237,820 | * | 12/1980 | Muller | 119/230 X |
| 4,640,227 | | 2/1987 | Blancheton et al. . | |
| 5,353,745 | | 10/1994 | Fahs, II . | |
| 5,732,653 | | 3/1998 | Yamine . | |
| 5,732,654 | * | 3/1998 | Perez et al. | 119/204 |

OTHER PUBLICATIONS

S. Moss et al., "Design and Economic Analysis of a Prototype Biosecure Shrimp Growout Facility" US Marine Shrimp Farming Program Biosecurity Workshop, 2/98, pp. 3–15.

Gary D. Pruder, "Biosecure Zero–Water Exchange Shrimp Production Systems", International on Progress and Prospect of Marine Biotechnology, 10/98, 34 pps.

The Oceanic Institute, "Biosecure, Cost–effective (BCE) Recirculating Systems for the Production of Marine Shrimp", May 4, 1998, pp. 1–7.

* cited by examiner

Primary Examiner—Robert P. Swiatek
(74) Attorney, Agent, or Firm—Ratner & Prestia

(57) ABSTRACT

A system and a method of growing shrimp, allowing balanced processes to accomplish the intensive culture of shrimp while reducing the risk of loss due to disease or environmental contaminants. Specifically, the present invention involves a unique combination of elements including: the use of specific pathogen free marine animal stocks, facilities which are effectively disinfected and isolated from sources of disease vectors and environmental contaminants, a beneficial, synergistic microbial population, and an aqueous medium of controlled composition. The system also comprises a specialized feed for supporting the microorganisms and marine animals, with zero-exchange of aqueous medium throughout the growout cycle such that the solids formed during operation, uneaten feeds, and fecal matter are retained in the system to provide an environment suitable for high yields and growth rates of marine animals.

35 Claims, No Drawings

BIOSECURE ZERO-EXCHANGE SYSTEM FOR MATURATION AND GROWOUT OF MARINE ANIMALS

FIELD OF THE INVENTION

The invention relates to the field of commercial cultivation of marine shrimp and marine bivalve mollusks, such as oysters. More particularly, the present invention relates to a biosecure zero-exchange system and methods for production and growout of such marine animals, in particular marine shrimp.

BACKGROUND OF THE INVENTION

The earliest shrimp farms consisted of near shore impoundments to which small numbers (1–3 shrimp/m$^2$) of wild caught shrimp postlarvae (wild seed) were stocked. Several hundred kilograms/hectare of adult shrimp were harvested periodically. These farms in essence practiced natural balanced ecosystem growout; no feed was added to the growth medium, no water was exchanged, no aeration or mixing was performed, and no water treatment was provided.

Most shrimp farm operations have retained dependence upon wild seed, but have raised stocking densities. Yields of 1,000–3,000 g/m$^2$ became standard, and some farm operations reported yields of 10,000 g/m$^2$. Some prerequisites to these higher yields were substantial modifications in farm management practices including but not limited to use and dependence upon supplemental feeds such as trash fish, manufactured feed or both; water exchange; and aeration/mixing. Generally the higher the stocking density, the more the farming system depended upon quality high protein and high energy feeds, water exchange, and aeration/mixing.

Currently, the impact and spread of shrimp diseases and mortality rates of shrimp are the dominant concerns of shrimp farmers around the world. Pathogenic viruses and other disease agents for shrimp are commonly found in wild shrimp populations and in river and coastal waters where shrimp or other crustaceans are or may be farmed. These pathogens are also carried by workers, birds, and wind, and may contaminate the shrimp population, with devastating results on crop growth and yield.

Thus, there is a need for an economical system or method for intensive production of high quality disease free marine animals which minimizes environmental side effects.

Development in the area of zero-exchange systems has led to significant changes in the art of aquaculture. For example, Fahs et al., U.S. Pat. No. 5,353,745, disclosed an apparatus and method for maintaining aquatic organisms in an essentially closed system, wherein the aqueous medium is removed from the tank, sterilized, and returned following purification and removal of solids produced in the system. Further, Lee et al., U.S. Pat. No. 5,961,831, disclosed a similar closed aquaculture system with automated water purification. Both of these inventions provide systems for the growth of commercially desired marine animals with near zero water replenishment. However, these systems utilize only "clean water" or "clean conditions" within the system. Therefore, these systems are not true zero-exchange systems as defined below because in the above noted systems, solids introduced into the system (typically feed) and produced within the system (typically fecal matter and metabolites) are continuously removed from the system along with recycled aqueous medium.

It is because solids are removed from the above systems that the systems fail to recognize the importance of maintaining solid residues, fecal matter, particulate matter, metabolites, and uneaten feed in an intensive zero-exchange growout system to provide an environment favorable for high growth rates and yields of shrimp and certain marine animals. "Clean water" systems do not establish these favorable conditions for intensive growth and harvesting of marine animals, specifically at levels of up to 10,000 kilograms per hectare. In the instant invention, adapting both the nutrition source and the mixing/aeration ratio compensates for any unfavorable changes in the system and maintains the favorable conditions throughout the growth cycle, whereas the industry has heretofore utilized filtering, flushing, or removing contaminants from the aqueous medium as the primary mechanism for controlling aqueous medium quality.

SUMMARY OF THE INVENTION

The present invention comprises a system and a method of growing shrimp, allowing balanced processes to accomplish the intensive culture of shrimp while reducing the risk of loss due to disease or environmental contaminants.

More specifically, the present invention involves a unique combination of elements including: 1) the use of a specific pathogen free shrimp population, 2) facilities which are effectively disinfected and isolated from sources of disease vectors and environmental contaminants, 3) a beneficial, synergistic microbial population, 4) an aqueous medium of controlled composition, 5) a specialized feed for supporting the microbial population and shrimp, and 6) zero-exchange of aqueous medium, and solids contained therein, throughout the growout cycle. The system also includes provisions for the photosynthetic needs of the microbial population.

Accordingly, the present invention comprises, in general, a biosecure zero-exchange growout system for marine shrimp comprising a disinfected or pathogen free aqueous medium, typically disinfected sea water; a mixture of synergistic non-pathogenic microorganisms; typically photoautotrophic algae and heterotrophic bacteria; a pathogen-free nutrition source, typically a reduced protein content and energy level feed nourishing both the shrimp and microbial population; and shrimp seed stock selected for freedom from specific pathogens, typically *Penaeus vannamei*.

The system further comprises a tank and associated equipment for containing the shrimp, the aqueous medium and the non-pathogenic microorganisms, wherein the tank and its contents are isolated from the surrounding environment to prevent the introduction of pathogens into the system, typically by using a cover and lining.

In a second aspect, the present invention also comprises a method for growing shrimp in a biosecure zero-exchange system comprising, in general, the steps of supplying a mixture of synergistic non-pathogenic microorganisms to a pathogen free or disinfected tank containing a pathogen free or disinfected aqueous medium of controlled composition; cultivating a bloom of such synergistic non-pathogenic microorganisms; depositing a population of specific pathogen free shrimp into the aqueous medium of the tank; supplying and maintaining of a nutrition source for the shrimp and the non-pathogenic microorganisms, in which the nutrition source comprises, in general, a pathogen free reduced protein, reduced energy feed adapted for a zero-exchange system; and isolating the growout tank and the growth medium from pathogens and the outside environment during the entire process described generally above by covering, the growout facility or the tank and growth media with a covering which provides a physical barrier to and prevents entrance of pathogens from the environment. Sufficient light to maintain the health and growth of both the shrimp and the microbial population is provided. Further, only aqueous medium lost by evaporation and other physical reasons is replenished with fresh aqueous medium. Complete or partial flushing of the system with fresh aqueous medium is to be avoided. Lastly, throughout the entire shrimp growth cycle uneaten feed, solid residues, and metabolites are retained in the system, establishing conditions for high growth and yield of marine animals such as shrimp.

DETAILED DESCRIPTION OF THE INVENTION

The present invention provides a biosecure system to accomplish the intensive culture of marine animals such as shrimp with zero aqueous medium exchange ("zero-exchange"). More specifically, the system comprises a synergistic interaction between 1) an algae and bacteria population in an aqueous medium for in situ waste treatment and the production of a live nutrition source, 2) marine animals, preferably shrimp, selected for freedom from pathogens, and 3) an adaptable nutrition source to support water quality and prevent the buildup of toxins. The system is sufficiently isolated to prevent the introduction of pathogens to the microbial population and marine animals in the presence of a zero-exchange during the entire growout cycle. When combined, these individual components form a balanced system, wherein the marine animal growth rate is increased by 100% to 500%, relative to "clean water" systems, and provides low cost production of high quality, disease free, commercially desirable marine animals for the marketplace.

Although the invention is described in terms of shrimp, one skilled in the biological arts can appreciate that the invention is equally applicable to the growth of other similar marine crustaceans and bivalves marine mollusks collectively referred to herein as marine animals. For example, the highest growth rates ever reported for oysters have been obtained in the system of the present invention. Specifically, oysters grown in accordance with the present invention grew to approximately 52 grams (live weight) in 198 days. However, such application will of course involve development and selection of specific pathogen free starter marine animals and adaptation of nutrition source materials to the animals specific requirements. These adaptations are believed to be well within the skill of those working in the relevant arts in light of the teachings of this disclosure.

The system itself is a combination of elements, arranged in such a manner as to produce a beneficial and synergistic effect. Accordingly, for purposes of description the system has been divided into its component parts, namely: an aqueous medium, the microbial population, the shrimp population, a growout tank and associated equipment, a nutrition source, and a method for using the system to achieve shrimp growout.

A.) The Aqueous Medium

The building block of the aqueous growth medium is specific pathogen free water. As used herein, the aqueous medium is based upon water that is disinfected, or derived from a source substantially free of known shrimp pathogens, and optionally further treated to provide a medium suitable for the growth of microorganisms and shrimp. That is, the aqueous medium must be specific pathogen free. The term "specific pathogen free," refers to elements, microorganisms or animals which are substantially free from known shrimp pathogens. Such pathogens are well known to one of ordinary skill in the art and outlined in more detail below.

Preferably, the water should be disinfected prior to introduction of the microbial population and the shrimp stock. How such water is disinfected or determined to be pathogen free is discussed below under Section II: The Growout Method.

The basic building block of the aqueous medium is usually seawater or an imitation thereof which has a suitable level of salinity. For applications which are located near the ocean, seawater is the logical choice of water for the aqueous medium and is preferred provided the water source is not contaminated with potential pathogens for the shrimp or is disinfected prior to use to remove such pathogens, known or unknown.

Seawater typically has a salinity of about 35 ppt., that is, it generally contains about 35 parts sodium chloride or equivalents thereof (or other naturally occurring salts) per thousand parts, by weight of water. However, in conjunction with other limitations of the present invention, the acceptable water salinity may vary widely. Trial runs with selected shrimp stocks have sustained systems with a salinity as low as 0.5 ppt. and as high as 50 ppt. Preferably, for this system the salinity is, however, in the range of about 2 to 10 ppt, advantageously at about 5 ppt.

By reducing the salinity of the aqueous medium to levels below that of seawater and by eliminating the need to constantly flush the growout system to remove contaminants, the requirement to use ocean water to grow shrimp is eliminated. This enables the production of shrimp farming facilities inland, away from coastal zones. There, the water used in the aqueous medium may come from a variety of sources. For example, the water may be well water, river or lake water, spring water, brackish water, or even tap water. Additionally, the acceptability of water salinities below sea water further simplifies water disinfection by enabling the use of disinfected fresh water (tap water) with disinfected sea salts, or a synthetic imitation thereof, to provide a suitable level of salinity and mineral content. The chemical makeup and manufacture of such imitation seawater is within the ability of one of ordinary skill in the art.

Additionally, there must be a limited amount of sulfur present in the aqueous medium of the present invention to sustain a minimal, yet necessary, amount of anaerobic digestion in the zero-exchange system and create an environment suitable for shrimp growth. However, the sulfur levels should not be so excessive as to cause the production of toxic amounts of sulfur compounds like hydrogen sulfide. The sulfur concentration in the aqueous medium for use in this system, therefore, is typically less than 200 ppt. Advantageously, the sulfur concentration is maintained at levels in the range of 10 to 100 ppt. The sulfur content of the aqueous medium may also be modified and adjusted by adapting the feed supply, altering aeration, or both, as described below in Section II: The Growout Method.

An important aspect of the present invention is the concept of "zero-exchange." As used herein, zero-exchange refers to a system wherein new aqueous medium is introduced into the system only to replenish water lost for physical reasons, specifically evaporation and experimental sampling, and not for chemical or biological dilution. As used herein, the concept of zero-exchange also relates to metabolites and solids provided to, or formed in, the system during growout. These solids and metabolites are retained in the system during the growout cycle and are critical for the growth of the shrimp stock and for maintenance of a synergistic microbial population.

B.) The Microbial Population

The aqueous medium of the system also contains a pathogen-free algal and bacterial population to provide what may be described as "green/brown water," that is, aqueous medium with a sufficient quantity of beneficial algae and bacteria which support and provide a synergistic relationship with the shrimp and nutrition source. This population comes from exposure of the aqueous medium and nutrition source to the environment or from an inoculum, as described below under Section II: The Growout Method.

Shrimp growth and survival rates, as well as the stability and quality of the zero-exchange environment are dependent upon the presence of these beneficial microorganisms in the aqueous medium. These microorganisms, such as algae and bacteria, have a synergistic relationship with the shrimp and nutrition source in the system and are essential in supporting and obtaining exceptionally high growth and survivability rates for shrimp in the zero-exchange system of the present invention.

The microbial population itself comprises a mix of photoautotrophic and heterotrophic algae and heterotrophic and chemotrophic bacteria which recycle uneaten feed, residual solids, and metabolites and enhance animal growth rates. Algae such as Navicula spp., Nitzchia spp., Thalasiosira spp., Chaetoceros spp., and Amphiprora spp. in the microbial population are particularly associated with rapid shrimp growth. With respect to the bacteria, nitrifying bacteria such as Nitrosomas and Nitrobacter contribute to the control of the ammonia levels and other potentially harmful nitrogenous compounds. Further bacteria such as *Vibrio pelagius* and Lactobacillus spp. are associated with supporting rapid growth and high survival rates of shrimp.

Specific bacteria that should be excluded because of potential pathogenic activity are *Vibrio anguillarum, Vibrio cholerae, Vibrio parahaemolyticus, Vibrio vulnificus, Vibrio alginolyticus, Vibrio damsela, Vibrio harveyi,* and *Vibrio splendidus.*

In order for the microbial population to properly support the growth of the shrimp, there must be employed a synergistic amount of the microbial population in the aqueous growth media. The synergistic amount of the microbial population may be established before, after or during the introduction of the shrimp into the system. However, for the reasons set forth below, it is not feasible to precisely define "a synergistic amount of the microbial population," as the microbial population will change constantly throughout the growth cycle in response to changes in, for example, light availability, protein content of the nutrition source, and level of aeration.

More specifically, the microbial population biomass and ratio of bacteria to algae to shrimp varies constantly during the growout cycle. The conditions within the system have a tendency to shift from a mixed and balanced combination of algae and bacteria to a predominantly bacterial system, which results in reduced animal growth rates relative to a balanced system. Table 1 illustrates examples of the effect of such bacterial shifts on shrimp growth rates and the importance of maintaining a balance between both bacteria and algae. The effects of such shifts are also described in more detail below.

Although the microbial biomass generally increases during the growout cycle, the shrimp constantly feed on the microbial population, as described under Nutrition Source. As conditions in the system change, so too does the microbial population. In essence, once the microbial population, the shrimp population, and nutrition source are introduced, the system approximates a balanced, self-regulating and self-maintaining system, with the nutrition source and level of aeration as primary control mechanisms of the microbial and shrimp populations.

Thus, after inoculation, an equilibrium is established between the shrimp, nutrition source, and microbial population. Previous "clean water" systems, as described above, have prevented the establishment of this equilibrium by cleaning the aqueous medium and sterilizing effluent streams prior to returning the aqueous medium to the primary tank. See, e.g., Lee, et al. U.S. Pat. No. 5,961,831.

It has been found that the mixed algae and bacteria microbial population is critical in the recycle of fecal matter and feed, and for maintaining required environmental conditions in the zero-exchange system of the instant invention. Specifically, the microbial population neutralizes and detoxifies fecal matter, other animal by-products, and uneaten nutrition source, which would otherwise accumulate in the system and become toxic to the shrimp population. Further, because of the capacity of the microbial population to rapidly adapt to changes in the environment, relative to the shrimp population, the microbial population acts as a buffer to prevent large and rapid variations in system conditions which adversely affect the shrimp. This "buffer effect" is critical in this system because no solids, residues, or uneaten feeds are removed during the growout cycle. Without the buffer effect provided by the microbial population and judicious selection of nutrition source ingredients as described below, the system balance can quickly deteriorate, resulting in loss of the shrimp population or retardation of shrimp growth.

This adaptability of the microbial population prevents sudden variations in system conditions, which could kill or substantially impair the growth rate of the shrimp population. By slowing down variations in system conditions, the microbial population facilitates the correction of the system to a desired state by a system operator. An operator, using the information described below, may readily control and prevent these potentially harmful system variations.

In addition, because the microbial population lives on and within the solid residues, fecal matter, un-consumed nutrition source, and any combinations thereof, the solids typically form small clumps, also known as floc particles. Such matter must be retained within the zero-exchange system throughout the growout cycle in order to sustain the equilibrium between the microbial population, shrimp, and nutrition source.

Specifically, in the presence of floc particles between 0.5 and 5 micrometers in diameter, shrimp growth rates increased by 53% over growth rates attained in "clean water" systems. Further, solids of a size 5.0 micrometers or larger improved growth rates of the shrimp by an additional 36%.

However, to retain the system balance between algae and bacteria, care must be taken to properly control the floc particle distribution in the water column and to support algal growth. As noted above, when the system shifts to a predominantly bacterial system, animal growth rates are reduced. To maintain the proper balance, the factors that favor shifts toward exclusively bacteria growth must be eliminated or negated. Such factors include shading of the light required for algal production by an increase in floc particles, excessive culture depth, shear forces generated by excessive aeration and mixing, and limits on the nutrient supply for algae. Lastly, one skilled in the microbial arts understands that some bacteria produce algaecide and some algae produce bactericide. Such antagonistic species are readily identifiable through co-culture experimentation and must be excluded from the system of the present invention.

As a measure of the amount of algae present in the system, Chlorophyll "a" should be maintained at or above 75 micrograms/liter. If the Chlorophyll levels fall below 75 micrograms/liter, mixing should be decreased to allow settling of floc particles during the day to improve light transfer and penetration into the water column to increase the growth of the algae. The floc particles may then be re-suspended by increased mixing during the night, if the algae can tolerate the mixing stresses. Further, if the oxygen content in the water exceeds about 12 ppm., the mixing should be increased to stabilize the system by favoring bacteria production by suspending more floc particles in the water column, thereby reducing the oxygen content in the water to more desirable levels as described below.

Table 1 illustrates the importance of maintaining a proper balance between the algae and bacteria in the system to retain the desired water quality. Specifically, Table 1 provides shrimp survival percentages and shrimp average final weights (in grams), in bacterial and mixed algal/bacterial systems at three different nutrition source protein levels.

When shrimp were fed a high protein nutrition source (35% dietary protein), in the predominantly bacterial system only 20% of the original shrimp stock survived to harvest. Comparatively, in the algal/bacterial system with the same nutrition source, 66.9% of the shrimp survived to harvest. The shrimp in the algal/bacterial system were also 24% greater in weight relative to the shrimp grown in the predominantly bacterial system. Similar effects for dietary protein levels of 15% and 25% are also illustrated in Table 1 below.

C.) Shrimp Population

The species of shrimp typically used is *Penaeus vannamei*, however, other shrimp species such as *P. monodon*, *P. chinensis*, and *P. stylivostris*, can also be used. Indeed, essentially any commercially available shrimp species, which has been developed under international standards for freedom from specific pathogens, can be employed in the present invention. These standards are provided by the International Council for the Exploration of the Sea (ICES, *Code of Practice to Reduce Risks of Adverse Effects Arising from Introduction of Non-Indigenous Marine Species*, C. J. Sinderman and D. V. Lightner, Elsevier Publishing Co. New York). All such shrimp are referred to herein as "specific pathogen free shrimp" and are well known in the art of shrimp culture. Wild shrimp stocks are to be avoided because of the unknown disease status of the shrimp and the presence of disease pathogens in most wild shrimp populations.

Further, because shrimp are multicellular, complex organisms, their ability to adapt to variations in system conditions is limited. Therefore, shrimp used in the system are preferably specific pathogen free shrimp selected and bred for performance in a zero-exchange environment.

Such shrimp have been developed, maintained, and are commercially available for use in the present invention by the Oceanic Institute, Waimanalo, Hawaii, and various cooperating research organizations. Alternatively, such shrimp may be independently developed using standard breeding and selection methods. Standard breeding and selection methods for shrimp are well known and understood in the art. For examples of selection programs, see Brad J. Argue et al., *Genetics and Breeding Applied to the Penaeid Shrimp Farming Industry*, pgs. 29–54, Oceanic Institute, 1999.

The shrimp introduced into the system are either post larvae (about 1/10 of a gram in weight) or juveniles (about 1–5 grams in weight). Typically, post larvae are used because in the zero-exchange system of the present invention, the growth rates are sufficient to offset the initial weight advantage of the juveniles in favor of a higher initial stocking density of post larvae.

The stocking density in actual trials has ranged from 50 to 300 animals per $m^2$. On a per weight basis, the shrimp are typically harvested at about 3 to 6 $kg/m^2$ after roughly 8–12 weeks.

D.) The Tank and Associated Equipment/Structure

The shape/configuration of the growout tank in which the aqueous growth medium and shrimp are deposited for the growout cycle is largely a matter of choice. Designs for tanks to contain the aqueous medium, microorganisms, and shrimp in accordance with the present invention may be, but are not limited to, raceway, rectangular, and pond growout tanks, as is well understood in the art. Important factors to consider in tank design for the present invention are the cover, isolation of the tank, oxygenation, availability of a light source, and circulation.

Where airborne disease is a concern, the tank, and preferably the growout area surrounding the tank can be covered with suitable plastic or other material to prevent the introduction of pathogens. Alternatively, one or more tanks may be housed in a building or other facility to prevent the introduction of pathogens and to isolate the tanks and growth medium from contaminants and pathogens.

If covered or housed in a building, however, the tank cover or building ceiling should be wholly or partially transparent or semi-transparent or have transparent or semi-transparent panels in order for light, including photosynthetically active light, to pass through at levels sufficient to insure the health of the microbial and shrimp populations in the growout tank throughout the growth cycle. Alternatively, artificial light, approximating natural light in spectrum, intensity, and cycle duration, may be provided if natural light cannot be made available to the grow-out medium. Such covers may also be designed to help regulate temperature within the growout facility, to prevent the atmosphere within the facility from getting either too hot or too cold, either of which can adversely impact the rate of shrimp and/or microbial growth and health. Such control mechanisms and facilities are well known in the art.

In a small operation or test facility, these covers may be designed to match the shape of the tank to minimize aqueous medium lost to evaporation.

Further, the depth of the tank also affects the growth of the algae population. As noted above, algae are important for the growth of the shrimp. If the tank depth is too shallow, light energy will be wasted. If the tank is too deep, the lower portion of the microbial population will not receive the necessary amount of light, thus shifting the system undesirably toward a predominantly bacterial population. The determination of the correct depth requires light attenuation studies of the specific system conditions, tank configuration, and water column depth, and may be accomplished by one of skill in the art using a light meter or similar measuring device.

The bottom of the tank must be lined or otherwise made impervious to exchanges with soil or ground water to exclude possible disease vectors and prevent leakage. Leakage that occurs into the system from untreated water sources or rain should be avoided. Typically, the tank is elevated so that it does not come in contact with the soil or ground, or the tank is an in- or on-ground concrete tank in which the concrete forms a barrier between the growth media and the soil or ground surrounding the tank. Additionally the walls of the tank may be sealed to facilitate cleaning or disinfection or may be lined with a covering which may be cleaned, disinfected, or replaced between growth cycles. These and other designs and configurations will be apparent to those skilled in the art.

The aqueous medium of this invention should be aerated and agitated. Typically, this is accomplished by circulation of the aqueous medium with a sufficient volumetric flow rate to keep solids formed in or introduced into the growth medium in suspension, as described below. The determination of the required rate of circulation is readily calculable by one of ordinary skill in the art.

Such flow generating devices may also contribute to or provide sufficient turbulence to provide adequate aeration of the aqueous medium, particularly if the tank is shallow and has a relatively high circulation rate. Such techniques are well understood to one of ordinary skill in the art.

E.) Nutrition Source

The unique character of the nutrition source is its design to simultaneously feed the shrimp, foster the growth of microorganisms, influence the character of shrimp excrement which makes the excrement suitable for in situ treatment and recycle, and to prevent harmful substance buildup within the system, such as sulfur compounds, nitrites or nitrates, or ammonia. Comparatively, in "clean water" systems, as those noted above, feeds are typically formulated as nutritionally complete diets, and the uneaten feed and excretory wastes released into the aquatic environment are considered to have a negative or polluting effect on water quality. Therefore, in "clean water" systems the solids are removed from the system to prevent a buildup of toxic nitrogenous and sulfur compounds.

The use of the nutrition source as a control mechanism has been ignored in other systems because external water treatment and sterilization effectively maintains system conditions in a "clean water" state, which until now has been erroneously perceived as desirable. Such external treatment actively filters out toxins, solids, and microorganisms before returning the aqueous medium to the tank. In the zero-exchange system of the present invention, these steps are not necessary because the feed is be adapted throughout the growout cycle to prevent the accumulation and buildup of toxic levels of the harmful materials while the microorganisms continuously recycle these materials for use in the system.

In order to prevent the system conditions from exceeding acceptable parameters, and possibly result in loss of the shrimp population or retardation of growth, the nutrition source must be adapted to maintain the system conditions at acceptable levels. For example, if the sulfur content of the system begins to elevate unfavorably, a nutrition source of reduced sulfur content should be provided until the sulfur content returns to acceptable levels by action of the microbial population, increased aeration, or both. Likewise, using a lower protein feed will control a buildup of undesirable levels of nitrogen compounds, such as ammonia.

However, because the microbial population recycles the uneaten feed, solid residues, and metabolites, alternative sources of protein remain available to the shrimp in the form of microbial biomass. Specifically, the shrimp consume the microorganisms in concert with the reduced protein and chemical energy in the nutrition source. By consuming the microorganisms in addition to the nutrition source, the growth rate of the shrimp is enhanced to rates greater than if the shrimp were to feed off a higher protein and energy nutrition source alone in a "clean water" system. Specifically, shrimp reach harvesting weight in about 8–12 weeks rather than the normal 12–16 weeks.

As with the microbial population, a precise definition of the nutrition source content is not possible because the system is in a constant state of change and self-adjustment, and accordingly the nutrition source content must also constantly change to accommodate these system conditions. Further, the overall amount of the nutrition source introduced varies depending upon the desired stocking density of the shrimp and microbial biomass.

Also, the nutrition source used in the present invention must be specific pathogen free. This dictates against using fish byproducts as a source of protein unless appropriately disinfected. Therefore, typical formulations include disinfected feed grains, corn, wheat, soybeans, animal byproducts, synthetic nutrients, or various combinations thereof. A typical starting point of the nutrition source composition is:

1. Proteins (including ten essential amino acids) and non-protein nitrogen sources such as nucleic acids and amino sugars. (although the latter non-protein sources may not be dietary essential nutrients for all species),
2. Lipids (including triglyceride fats and oils, essential fatty acids, phospholipids, steroids—cholesterol),
3. Vitamins (fat-soluble vitamins A, D, E, K & possibly carotenoids, water-soluble vitamins—thiamine, riboflavin, pantothenic acid, niacin, folic acid, pyridoxine, biotin, choline, inositol, vitamin C, para-amino benzoic acid),
4. Minerals (including macro and trace elements Ca, P, Mg, Na, S, Fe, Zn, Cu, Mn, Co, I, Se, Cr, and Mo), and
5. Energy (in the form of chemical energy stored within chemical bonds of lipids, proteins and carbohydrates).

The nutrition source is formulated to provide essential nutrients not only to the shrimp but the microbial population as well. Conventional feed formulations metabolized by shrimp, other animals and bacteria may not include all essential nutrients required by the algal population. Specifically, silicate, which is not in the shrimp diet, must be included in the nutrition source for continued algal growth. Further, algae also require Thiamin, Biotin, and vitamin B12, which may not be provided by the feed or bacterial metabolism by-products. By monitoring the system conditions and shrimp growth rates, which is within the skill of one of ordinary skill in the art, the nutrition source composition may be adjusted to maintain the system conditions within desired shrimp growth parameters.

As discussed below under the Growout Method, the need for continual vitamin and mineral additions conventionally required by other "clean water" systems is discouraged in the zero-exchange system of the present invention. This is because such materials accumulate in the microorganisms and therefore remain readily available to the shrimp, rather than being continuously flushed out of the system or removed by filtering action. It should also be noted that continuous vitamin and mineral additions are also discouraged because buildup of toxic trace elements, such as Copper, Molybdenum, and Selenium, can occur.

Also, the feed may be used to adjust other factors such as the particulate organic carbon (POC) and Adenosine Tri-Phosphate (ATP) levels. Preferable POC values in the water column are 7.0 mg./liter or higher. However, it has been shown that reduced POC values also reduce the growth of the shrimp. Specifically, when the POC values were reduced to 1.85 mg./liter, the shrimp growth rate was reduced by 35%. Furthermore, the preferred ATP level is 12.5 micrograms/liter or above. The effect of reducing the ATP level parallels the effect of reducing POC, specifically, as the ATP levels decrease, the growth rate also decreases. For example, when ATP levels were 2.1 micrograms/liter, the shrimp growth rate was reduced by 35%.

As noted above, the shrimp consume the microbial population in the system, as well as the nutrition source. Table 1 illustrates the benefits of using a properly maintained mix of algae and bacterial in concert with an adaptable feed rather than using only a predominantly bacterial system.

Specifically, Table 1 provides a food conversion ratio, wherein the total weight of nutrition source introduced into the system is divided by the total weight of shrimp harvested. When shrimp were fed a diet of 35% protein, the feed conversion ratio in a predominantly bacterial system was 18.9. Therefore, 18.9 grams of nutrition source was needed to produce 1 gram of shrimp at harvest. Comparatively, in the mixed algal/bacterial system only 2.4 grams of nutrition source was needed to produce 1 gram of shrimp. Thus, 7.8 times more nutrition source was needed in the predominantly bacterial system to produce the same weight of shrimp in the mixed system. Table 1 illustrates similar effects at different nutrition source protein levels.

II. The Growout Method

Prior to the introduction of any aqueous medium to the tank, the tank should be disinfected. Such disinfection may take the form of gas, liquid, heat, or radiation treatment at sufficient levels to eliminate any potential shrimp specific pathogens. Typical disinfectants are chlorine, ozone, and ultraviolet light. Such methods of disinfection are well known to one skilled in the art. Usually, chlorination is used to disinfect the tank, and is the preferred method of disinfection in the zero-exchange system.

Whichever disinfection method is used, it is important that any residual disinfectant be removed or adjusted to levels safe for the introduction of any aqueous medium, microbes, and shrimp. Thus, the tank and associated equipment should be thoroughly flushed after treatment with chemicals prior to introduction of water, microbes or shrimp feed stock. It will also be understood that appropriate disinfection processes may be site specific, depending upon the prevalent pathogens of the area.

Similar procedures may be employed to disinfect the equipment associated with the tank. If salts are added to make up the aqueous medium, such salts should also first be disinfected, for example by chlorination. Alternatively, disinfected salts may be obtained from suppliers as is well known in the art.

Disease causing pathogens generally fall into one of three categories: viruses, protozoa, or metazoan parasites. Of the pathogens, certain viruses can cause catastrophic losses in shrimp, namely; YHV (Yellow Head Virus), WSSV (White Spot Syndrome Virus), and TSV (Taura Syndrome Virus), and others well known to one of skill in the art. Protozoan and metazoan parasites which are known to have an adverse impact on the growth and maturation of shrimp include Microsporidian and Gregarine. As new diseases and pathogens are found in shrimp populations, the list of pathogens that must be excluded becomes a rapidly moving target and therefore must be continuously updated. The current list of pathogens is provided in the article by D. V. Lightner and R. M. Redman, *Strategies for the Control of Viral diseases of Shrimp in the Americas*, Fish Pathology, 33:165–180 (1998).

Using disinfected water minimizes the risk of infecting the system with such pathogens, but if such pathogens are known or suspected to be present in the water source, use of organism specific disinfecting procedures may be desirable. Such techniques are well known in the art. Alternatively, the aqueous medium may be obtained from sources that are free of known shrimp pathogens. Such sources are described above.

Except for organism specific procedures, generally the water used in the aqueous medium is itself disinfected and treated to form disinfected aqueous medium. Typically disinfection is accomplished by using standard chemical, radiation, or sonic disruption methods as is customary in the art. These steps apply equally to water from whatever source derived, be it from a lake, river, pond, or ocean.

These and other methods of disinfection are well known to those skilled in the art. Usually, chlorination is used to disinfect the aqueous medium, and is the preferred method.

Additionally, the disinfected water may need to be treated in order to alter the salinity of the aqueous medium to levels appropriate for the growth of shrimp. Effective treatment may involve the addition of sea salts to freshwater, the dilution of seawater with freshwater, as well as solids and chemical removal from river water and adjustment of saline groundwater. The salinity may then be adjusted accordingly by either adding an appropriate amount of disinfected sea salt or disinfected water having an appropriate level of salinity. Techniques to alter salinity of water are well known to one of ordinary skill in the art.

After introduction of the aqueous medium into the tank shrimp pathogen bioassays should be conducted to verify the effectiveness of the disinfection process and verify freedom from known shrimp pathogens. Such assays are well known in the art. If shrimp pathogens are found, the aqueous medium should be discarded and the disinfection procedures for the tank and aqueous medium should be repeated.

In order to maintain the pathogen free conditions and zero-exchange rate of the system, any aqueous medium supplied to the system to replenish lost aqueous medium must also be specific pathogen free water which has been previously disinfected and treated, as discussed above.

By reducing the amount of aqueous medium removed from the system to zero, the bio-security of the system can be maintained and the system can operate in a cost-effective manner. Further, as noted above, by not removing aqueous medium, the microorganism population establishes a bloom in the system of sufficient biomass to support and enhance the shrimp population growth rate and recycle solid residues and metabolites for use in the system.

Accordingly, the system of the present invention minimizes the amount of disinfected aqueous medium introduced to that needed to replenish evaporative or other physical losses. Such replenishment is typically about 5 % of the total volume of aqueous medium over the entire production run, or about 0.1% per day. The replenishment is accomplished by adding specific pathogen free aqueous medium, disinfected water, and optionally disinfected sea salt, to the system. Primarily replenishment is done to replace liquid lost to evaporation and samples taken for analysis of the system.

At the beginning of the process of this invention, the aqueous medium is typically inoculated with specific pathogen free bacteria and algae, as detailed above. The inoculum introduces the required microbial population into the system. An inoculum containing sufficient quantities of microbes to establish a bloom of the appropriate microbial population may be readily obtained from The Oceanic Institute.

Alternatively, an inoculum of microorganisms may be initially obtained by exposing a solution of aqueous medium and nutrition source to the environment until a microbial population bloom develops. However, if the exposure method is employed, it is important to ensure that the bloom does not contain shrimp specific pathogens. Preferably shrimp pathogen bioassays are performed on the microbial bloom before introduction into the system. If shrimp pathogens are found, the bloom should be disposed of in an appropriate manner, and the exposure process repeated until a pathogen free bloom develops.

Once a microbial population is established, it is important to select for a microbial population that grows well in a selected range of feeds and nutrients under mixing and light conditions favored in the system for the reasons disclosed herein. Therefore, volumetric loading, densities, and additives used in the development of the inoculum should be representative of the conditions expected or preferred in the growout system of the present invention. Adjustments may be made in the feed composition, mixing, and light conditions to stabilize the microbial population and maintain desirable water quality.

The inoculation step of the process may take place in the tanks and/or facilities which will ultimately be utilized for shrimp growout, or in separate tanks which are likewise isolated from contaminants and then transferred to the growout tanks to commence the next growout cycle. Typically, the medium is then incubated at a temperature in the range of about 25° Celsius until a bloom is established.

Sufficient quantities of the nutrition source are added to support the microbial population and prepare the system for the addition of the shrimp. Preferably, the amount of nutrition source is sufficient to sustain the desired starter shrimp population. Such amounts are readily calculable to one of ordinary skill in the art.

During the bloom development period, the system should be isolated to prevent the introduction of specific pathogens into the system. The isolation is typically accomplished by covering the tank with a transparent or semi-transparent cover, as indicated above.

The shrimp may also be added to the system while the bloom is developing. This is because the post larvae and juveniles initially feed off the developing bloom as well as the nutrition source. Preferably, the shrimp may be added after a bloom is established.

Additionally, the aqueous medium is circulated at a rate sufficient to maintain most of the sediment in suspension to reduce the zones of anaerobic activity and provide a supplemental source of oxygenation. In the preferred embodiment, the circulation rate is sufficient to maintain from about 10% to about 90% of the sediment in suspension. Most preferably, about 50% to about 90% of the sediment is maintained in suspension. It will be appreciated by one skilled in the art that the circulation flow rate will vary depending on the volume of aqueous medium present in the system, the shape of the tank, and the amount of desired anaerobic activity in the system.

Typically the nutrition source is added to the system by hand, which is also the preferred method. Care must be taken to not introduce shrimp pathogens into the system during feeding. Accordingly, sterile gloves and protective suits may be required. Other methods of introducing feed and the amounts required by the shrimp population are readily apparent to one of ordinary skill in the art.

As noted above, the system of the present invention generally employs a nutrition source with reduced protein content that may be adapted throughout the growout cycle to compensate for system changes. Preferably, the nutrition source starts with protein levels of about 15% to 20% crude protein including trace metal and vitamin mixes. After two to four weeks the protein concentration is increased to 25% to 35% and the trace metal and vitamin mixes are eliminated. This diet is used until the nitrogen levels reach 15 milligrams/liter. Typically, with the proper balance of microbes present in the system, the ammonia levels do not reach the 15 milligrams/liter level until about day 50 (at a stocking density of 50 animals per $m^2$). Conversely, if the system is not in a proper balance (for example, if insufficient light is supplied to support algal population growth), the system may reach an ammonia concentration of 15 milligrams/liter in about 27 days. If the ammonia, nitrogen and nitrite levels meet or exceed 15 milligrams/liter, the crude protein in the nutrition source should be reduced back to 15% to 20% with the re-addition of trace vitamins and minerals to stimulate algae growth.

A reduced protein feed during the growout cycle is important to assist the microbial population in preventing accumulation and in-situ recycle of toxic nitrates, nitrates and ammonia excreted into the system. For example, continuously using higher protein, higher energy feeds causes a build up of toxins to levels where the microbial population can no longer recycle the toxins for use in the system, potentially resulting in a loss of the shrimp population or a reduction in the yield or growth rates.

Table 2 illustrates the growth rates of shrimp in the system of the present invention over an eight week period during a typical growth cycle. Feeding during the day versus feeding during the night versus feeding during both the day and night produced no significant differences in shrimp growth.

During the shrimp growth process which follows, the growth medium is agitated, optionally by circulation, aeration, possibly by agitation, and provided with nutrients necessary for shrimp and microbial growth. The growth medium is aerated to provide oxygen to the system in sufficient amounts to support the shrimp population. Typically, the oxygen levels in the aqueous medium in the system are in the range of about 3 ppm. to about 16 ppm., preferably 4 ppm. to about 8 ppm. In the most preferred embodiment of the invention, the aeration device should provide an oxygen level of about 5 ppm. If sufficient air or oxygen is available, such oxygen levels may be maintained by the agitation/circulation system described above. The use of aeration and mixing is important to maintain acceptable oxygen levels and an essentially aerobic system. However, as noted above, excessive mixing may interfere with a stable algal population by mixing solids into the water column.

The optimum temperature of the aqueous medium for growth of shrimp varies for each shrimp species and is well known in the art. For example, for *Penaeus vannamei* the temperature of the tank and aqueous medium should be between 25° C. and 33° C., with the preferred temperature of about 29° C. to about 31° C.

Once stocking and startup are completed, the normal growout cycle is about 8–12 weeks for a starter population of juvenile shrimp larvae. Ideally, the shrimp are harvested when they have achieved a biomass of 4–6 $kg/m^2$ and up to about 10 $kg/m^2$. The typical maximum amount of time that may elapse before harvesting the shrimp is 12 weeks, while the minimal amount of time is about 8 weeks (all assuming shrimp larvae as the start-up stock).

During the normal period of operation of the system, metabolites and solid residues are formed comprising un-consumed feed, fecal material, and other by-products. It is the unique feature of this invention that these solid residues and metabolites are retained and utilized within the system for the duration of system operation. Such retention is critical to the successful operation of this system. As noted above, under the Microbial Population and Nutrition Source, by retaining these materials in the system, conditions in the system are favorable for an enhanced growth rate of shrimp.

At harvesting, the shrimp are removed from the system. A net removes the shrimp, preferably by a straining the aqueous medium as it is removed from the tank. Other methods of harvesting the shrimp are well known in the art. The remaining aqueous medium may be treated (typically by removal of any solids, nutrients, and metals) and reused. Care must be taken to prevent the introduction of pathogens into the system in the course of such treatments. Normally, however, the water and solids contained therein will be removed from the system, treated as necessary, and disposed of in an environmentally safe manner. The low volume of water utilized in the system facilitates such sanitary disposal.

TABLE 1

Biological performance of L. vannamei fed three feeds with different protein levels with two microbial systems, and results of water quality parameters taken on the last day prior to shrimp harvest. Entries are sample mean ± SE.

| Dietary protein level (%) | 15 | | 25 | | 35 | |
|---|---|---|---|---|---|---|
| | Algal | | Algal | | | |
| Microbial System | Bacterial | Bacterial | Bacterial | Bacterial | *Bacterial | Algal Bacterial |
| Survival (%) | 86.4 ± 2.4 | 89.4 ± 2.0 | 81.9 ± 5.7 | 86.4 ± 1.2 | 20.0 ± 6.7 | 66.9 ± 5.6 |
| Final weight (g) | 5.2 ± .10 | 9.5 ± 0.41 | 10.5 ± 0.41 | 14.2 ± 0.62 | 13.7 ± 1.20 | 17.1 ± 0.90 |
| Biomass gain (g/m$^2$) | 172.2 ± 3.8 | 373.2 ± 24.4 | 379.4 ± 49.7 | 564.6 ± 59.4 | 91.1 ± 101.5 | 516.8 ± 46.7 |
| Food Conversion Ratio (lb. feed/lb. shrimp harvested) | 3.8 ± 0.05 | 2.4 ± 0.09 | 2.5 ± 0.2 | 2.0 ± 0.1 | 18.9 ± 11.7 | 2.4 ± 0.1 |
| Chlorophyll-"a" ($\mu$g/L) | 0.77 ± 0.45 | 133.8 ± 31.79 | 0.31 ± 0.06 | 290.1 ± 18.7 | 1.14 ± 0.24 | 209.2 ± 58.24 |

*Treatment failure due to poor water quality across replicates

TABLE 2

Typical growth of shrimp in the zero exchange system

| | Week 0 | Week 2 | Week 4 | Week 6 | Week 8 | Overall |
|---|---|---|---|---|---|---|
| Weight (grams) | 1.58 ± 0.06 | 4.87 ± 0.36 | 9.44 ± 1.23 | 15.82 ± 0.92 | 18.89 ± 1.64 | |
| Weekly Growth Avg. (grams) | | 1.65 ± 0.20 | 2.28 ± 0.44 | 3.19 ± 0.16 | 1.53 ± 0.37 | 2.16 ± 0.21 |
| Shrimp Feed Conversion Ratio | | 0.74 ± 0.09 | 1.07 ± 0.20 | 1.36 ± 0.07 | 3.21 ± 1.56 | 1.76 ± 0.53 |
| Shrimp Survival | | | | | | 69.7% ±12.7% |

*No significant difference between day/night, day only and night only feeding regimes.

What is claimed is:

1. A biosecure zero-exchange aquaculture system for producing commercially desirable marine animals comprising:
   (a) specific pathogen free saline aqueous medium including: a specific pathogen free microbial population which recycles uneaten feed, residual solids, metabolites, and enhances growth rates of a stock of specific pathogen free crustaceans or mollusks;
   (b) a stock of specific pathogen free marine crustaceans or marine bivalve mollusks;
   (c) a specific pathogen free tank in which said aqueous medium is contained;
   (d) a specific pathogen free nutrition source adapted to provide appropriate proportions of all nutrients and minerals required for survival and growth of said stock and the microbial population throughout system operation;
   (e) means for agitation and aeration to provide proper proportions of aerobic and anaerobic conditions within the growth medium, maintain necessary oxygen levels, and keep a portion of the solids and microbes in suspension in said growth medium; wherein, during normal operation of the system,
      1) uneaten nutrition source, solid residues, and metabolites are retained in said system, establishing favorable conditions for high growth and yield of said marine crustaceans or mollusks; and
      2) said system is adapted to exclude the introduction of contaminants from the surrounding environment into the system to maintain specific pathogen free conditions throughout system operation.

2. A system as recited in claim 1, wherein said marine crustaceans are shrimp.

3. A system as recited in claim 2, wherein said shrimp comprise at least one of *P. vannamei, P. monodon, P. chinensis,* and *P. stylirostris*.

4. A system as recited in claim 1, wherein said microbial population comprises photoautotrophic algae, chemotrophic bacteria, and heterotrophic bacteria.

5. The microbial population of claim 4, wherein microbial population further comprises diatoms of at least one of Navicula, Amphiprora, and Nitzchia.

6. The microbial population of claim 4, wherein said bacteria are at least one of Nitrosomas and Nitrobacter.

7. The system as recited in 1, wherein floc particles are formed.

8. The flocs as recited in claim 7, wherein said floc particles are between 0.5 and 5 micrometers in size.

9. The flocs as recited in claim 7, wherein said floc particles are greater than 5 micrometers in size.

10. A system as recited in claim 1, wherein said medium has a salinity of 0.5 to 50 ppt.

11. A system as recited in claim 1, wherein said medium has a salinity of 2 to 35 ppt.

12. A system as recited in claim 1, wherein said medium has a salinity of 2 to 10 ppt.

13. A system as recited in claim 1, wherein said medium has a sulfur concentration, and said sulfur concentration is controlled at less than 200 ppt.

14. A system as recited in claim 1, wherein said medium has a sulfur concentration, and said sulfur concentration is controlled at less than 100 ppt.

15. A system as recited in claim 1, wherein said medium is exposed to specific pathogen free air and said agitation means also serves as said aeration means.

16. A system as recited in claim 1, wherein said container is within a covered enclosure and the covering over said container is transparent and is exposed to ambient natural light.

17. A system as recited in claim 1, wherein said nutrition source contains less than 35% by weight protein.

18. A system as recited in claim 1, wherein said nutrition source contains more than or equal to 15% by weight protein.

19. A system as recited in claim 1, wherein said nutrition source maintains particulate organic carbon at or greater than a concentration of 7 milligrams per liter aqueous medium or greater.

20. A system as recited in claim 1, wherein said nutrition source maintains adenosine tri-phosphate at or greater than a concentration of 12.4 micrograms per liter aqueous medium.

21. A method for growing marine shrimp in a biosecure, zero-exchange environment comprising
  a. providing a specific pathogen free aqueous medium,
  b. depositing said pathogen free aqueous medium in a specific pathogen free container closed to inadvertent contaminant intrusion,
  c. providing a specific pathogen free inoculum of a microbial population and adding said inoculum to said aqueous medium,
  d. adding to said medium a starter supply of specific pathogen free marine shrimp to establish a growth population thereof in said medium, and thereafter aerating and agitating said medium for an extended period of time while throughout that period adding to said medium a specific pathogen free nutrition source for said microbial and shrimp populations at a rate appropriate to supply the necessary nutrients for said populations at any point in time and also throughout that period,
  e. retaining solid residues, uneaten nutrition source and metabolites in said system to establish conditions favorable for the growth of said shrimp.

22. The method as recited in claim 21, wherein the aqueous medium is disinfected.

23. The method as recited in claim 21, wherein the aqueous medium is disinfected by chlorination.

24. The method as recited in claim 21, wherein the aqueous medium is seawater.

25. The method as recited in claim 21, wherein the aqueous medium is imitation seawater.

26. The method as recited in claim 21, further comprising optionally determining the amount of said medium or component thereof lost from said container and adding an additional amount of said medium sufficient to replace any amount determined to have been lost.

27. The method as recited in claim 26, wherein the lost aqueous medium is less than 5% of the total volume of the aqueous medium in the system over the entire growout cycle.

28. The method as recited in claim 26, wherein the lost aqueous medium is less than 0.1% per day of the total volume of the aqueous medium in the system.

29. The method as recited in claim 21, wherein about 10% to about 90% of said solid residues, uneaten nutrition source and metabolites are maintained in suspension.

30. The method as recited in claim 21, wherein about 50% to about 90% of said solid residues, uneaten nutrition source and metabolites are maintained in suspension.

31. The method as recited in claim 21, wherein aerating provides oxygen to levels of about 3 ppt. to about 16 ppt.

32. The method as recited in claim 21, wherein aerating provides oxygen to levels of about 4 ppt. to about 8 ppt.

33. The method as recited in claim 21, wherein aerating provides oxygen to levels of about 5 ppt.

34. The method as recited in claim 21 wherein the temperature is maintained between 25° C. and 33° C.

35. The method as recited in claim 21, wherein the shrimp are harvested at the end of a growout cycle.

* * * * *